Oct. 18, 1932.  M. CARBONARO  1,883,762
APPARATUS FOR MEASURING AND FEEDING LIQUIDS
Filed June 6, 1929
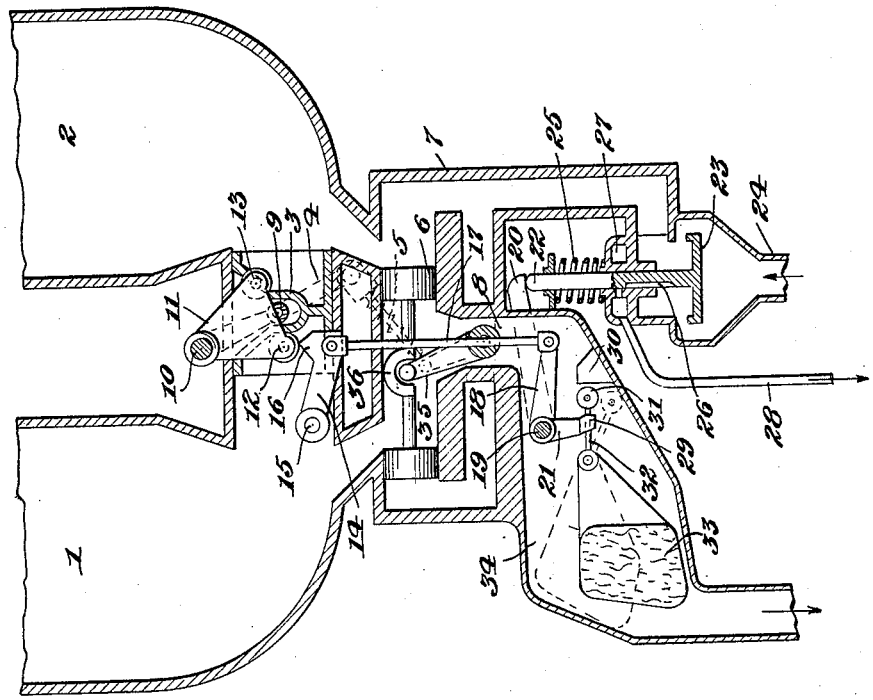
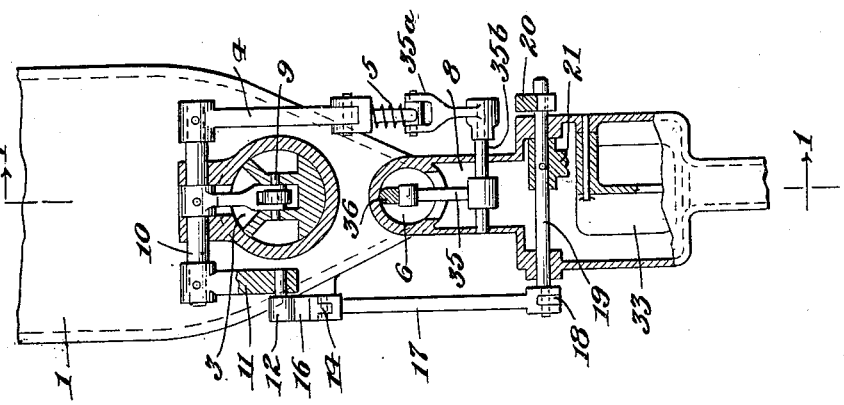
Inventor:
Mario Carbonaro,
by
Attys.

Patented Oct. 18, 1932

1,883,762

UNITED STATES PATENT OFFICE

MARIO CARBONARO, OF PARIS, FRANCE, ASSIGNOR TO SOCIÉTÉ HARDOLL, ETABLISSEMENTS HARIVEAU ET DOLIMIER ET RENÉ PORTE ET CIE. RÉUNIS, OF SEINE, FRANCE

APPARATUS FOR MEASURING AND FEEDING LIQUIDS

Application filed June 6, 1929, Serial No. 368,877, and in France June 15, 1928.

The present invention relates to apparatus for measuring and feeding liquids, and chiefly gasoline, and is particularly applicable to feeding apparatus having two combined measuring vessels adapted for automatic functioning by the action of the excess of pressure produced by the complete filling of one of the said vessels.

To provide for an accurate measuring and feeding with this class of apparatus, it is necessary (1) that the vessel which is being filled shall not be connected with the feeding (or discharge) conduit if the said vessel is not entirely full of liquid; (2) that the vessel, preliminarily filled and connected to the said feeding conduit, shall not be again placed in the filling position before the said vessel is completely emptied.

The first of these conditions is obviously realized in the automatic apparatus, due to the method of functioning, but on the contrary it may happen that the reversal takes place prematurely before the complete emptying of the vessel that is being emptied.

To obviate the aforesaid drawback, and according to the invention, the closing of the feeding conduit is effected by the first part of the displacement of the element actuating the reversing device, which is caused by the excess of pressure.

According to the invention, and for the said purpose, the excess of pressure produced by the complete filling of the vessel that is being filled will start the displacement of the said element actuating the reversing device, and this initial and partial displacement actuates a power transmission device which at once closes the conduit by which the said vessels are supplied with liquid.

To obviate the closing of the said supply conduit when one of the vessels is emptied, a latch controlled by a float disposed on the discharge conduit prevents the said power transmission device from operating.

It is preferable to reduce the pressure of the liquid in the measuring vessel which has been prematurely filled, by connecting it with an emptying orifice as soon as the liquid supply conduit has been closed.

The accompanying drawing shows, by way of example, an apparatus for delivering liquids comprising automatic releasing means according to this invention and:

Fig. 1 shows the same in vertical section with mechanism parts shown in full lines to illustrate the relationship thereof to the parts in section.

Fig. 2 is a corresponding vertical section through the axle 10.

The said apparatus comprises two combined measuring vessels 1 and 2 whose upper parts (not shown) may comprise a conduit connecting said vessels together for the exchange of the atmosphere, as well as the usual closing devices and a clack valve for the admission of air.

At the lower part of the said measuring vessels and in communication with the same is a driving piston 3 which is under the control of the excess of pressure of the liquid, and driving (by means of a device adapted for abrupt action according to the invention and consisting of a lever 4 and a spring 5) a distributing slide valve 6 which connects the vessels 1 and 2 alternately with the discharge conduit 7 of the supply pump, or with the feeding conduit 8 of the apparatus. The lever 4 which is actuated by the driving piston 3 by means of the shaft 9, is rotatable on a stationary axle 10, upon which is mounted a sector 11 carrying the rollers 12—13 or a cam of suitable force, either of which is secured to the lever 4. The arm 14 is pivoted to a tooth shaped member 16 which is turned upwardly and whose rounded point may slide upon the rollers 12 and 13.

The upper end of the vertical rod 17 is pivoted by means of a fork to the arm 14, at a point adjacent the tooth 16. The lower end of the said rod 17 is pivoted to a lever 18 secured to the axle 19, to which axle are secured arms 20—21. The elements 10 to 18 inclusive, are shown in elevation in Fig. 1, superimposed upon the sections, in order to illustrate the connection of these parts to the device shown in section.

The arm 20 rests at its outer end upon the stem 22 of a valve 23 inserted into the discharge conduit of the supply pump, not shown. The said valve 23 is controlled by a spring 25 urging it upon its seat and thus adapted to stop the supply of the fluid to the measuring vessels. It is preferable to form in the rod 22 a groove 26 which in the closing position of the valve 23 will connect the conduit 7, through the chamber 27, with the conduit 28, which may be connected with the main recipient. At the end of the arm 21 is a fork 29 which during the operation may meet the abutment 30 or a ball 31 secured to the end of a rod 32 attached to a float 33 disposed in a float chamber 34 mounted in the discharge conduit 8 of the measuring vessels. The said fork 29 surrounds the rod 32 when the float 33 is in the position shown by the full lines.

The outer end of the lever 4 is connected to the spring 5, whose other end is secured to one end of arm 35a which is fixed on shaft 35b to which is fixedly connected an arm 35 having an upper end which is pivoted in the part 36 of the rod of the valve 6.

In the functioning of the apparatus, two circumstances may be considered.

The vessel 1 may be emptied before the vessel 2 is completely filled (as shown in the figure). The float 33 has the position shown in the full lines, and the ball 31 is adjacent the stop 30. The device consisting of the arms 21 and 20 cannot turn in the counter-clockwise direction since the fork 29 is held by the ball 31. The valve 23 cannot be closed for this reason. The excess of pressure is produced in the vessel 2 in the usual manner by reversing the device in the known manner.

On the contrary, if the vessel 1 is not entirely emptied when the vessel 2 has been filled, the excess of pressure thus produced will move the piston 3 slightly to the left, without actuating the slide valve 6. The lever 4 turns the shaft 10, thus turning the sector 11 secured thereto; the tooth 16 slides upon the roller 12; the spring 5 is slightly compressed and the rod 17 is raised by the spring 25 by means of the arm 20, the shaft 19 and the arm 18. Since the float 33 is in the position shown in the dotted lines, its stop 31 will not prevent the motion of the fork 29 of the arm 21, and the valve 23, when closing, will cut off the liquid from the vessel 2, but when the valve 23 is closed, this connects the vessel 2 with the conduit 28 by means of the conduit 7, the groove 26 and the chamber 27. The pressure will thus fall in the vessel 2, and since the action of the spring 25 is less than that of the spring 5, which spring, already compressed by the partial displacement of the piston 3, will bring the latter by its expansion into the extreme position shown in the figure. Hence the tooth 16 will be again lowered by the roller 12; the rod 17 is thus lowered and again opens the valve by means of the levers 18 and 20. In the meantime, the vessel 1 has been entirely emptied, and the float 33 has returned into the position shown in the full lines. When the pump continues to operate, this will fill the vessel 2, thus producing in the latter an excess of pressure moving the piston and the valve 6 in the inverse direction, and since the ball 31 is now in the position shown by the full lines by the lowered float, it thus prevents the rotation of the arm 21, and hence prevents any improper closing of the valve 23. After the device is reversed, the vessel is placed in the emptying position, and the succeeding operations follow in the order above indicated.

In the example above indicated, the strength of the spring 5 should exceed that of the spring 25 of the valve 23, so as to bring the piston 3 into the initial position in spite of the spring 25, and also to hold the valve 23 in its open position.

Although in the apparatus the actuating device 3 and the reversing device 6 are different, the present invention is also applicable to the case in which the reversing device is directly actuated by the excess of pressure.

Having now particularly described and ascertained the nature of my invention and in what manner the same is to be performed, I declare that what I claim is:

1. A liquid measuring device comprising at least two measuring tanks, a filling conduit, a discharge conduit, a valve for closing said filling conduit, an element responsive to the liquid pressure in the tank being filled, a reversing element for alternately establishing communication of the tanks with the filling and discharge conduits, said reversing element being actuated by said pressure responsive element, and means for connecting said pressure responsive element and said valve for preventing the closure of said valve when said pressure responsive element is in position for the filling of a tank, and released by said pressure responsive element upon a partial displacement thereof when the tank is filled for permitting the closure of said valve.

2. Apparatus according to claim 1, including a float located in the discharge conduit and connected to said connecting means and operative in its lowered position to prevent closing of said valve.

3. Apparatus according to claim 1, including a secondary discharge conduit, and means controlled by said valve for establishing communication between the tank being filled and the said secondary discharge conduit when the valve has closed the filling conduit.

4. Apparatus according to claim 1, including a secondary discharge conduit, a stem rigid with said valve and having a passage formed therein so that the tank being filled is placed in communication with the said secondary discharge conduit when the valve has closed the filling conduit.

5. Apparatus according to claim 1, in which the means for connecting said pressure responsive element to the valve comprise a cam actuated by the said pressure responsive element, and a link-and-lever system actuated by said cam.

6. Apparatus according to claim 1, in which the means for connecting said pressure responsive element and the valve comprises a cam constituting a rocking sector actuated by the pressure responsive element and having two rollers mounted thereon, and a link-and-lever system actuated by said rollers.

7. Apparatus according to claim 1, comprising a float located in the discharge conduit, a movable abutment actuated by the said float and brought by said float when in its lowered position into the path of movement of said connecting means whereby to prevent the closure of the valve.

8. Apparatus according to claim 1, including a float located in the discharge conduit, said connecting means including a bifurcated lever, a rod connected to said float to move therewith, movable abutment carried by said rod, said rod being mounted for movement into a position between the arms of said bifurcated lever while the float is moving downward, whereby to bring said movable abutment into the path of movement of said lever and thereby prevent the closure of said valve.

9. Apparatus according to claim 1, including a spring to be energized by the initial movement of said pressure responsive element and operating thereafter upon said element to move it toward its end positions.

10. An apparatus as described having a pair of measuring tanks, feed and discharge conduits, means controlled by the liquid pressure in the respective tank being filled for alternate filling and discharge of the tanks, means controlled by the first-named means and by a means operated by the liquid of the discharging tank for suspending the liquid flow to both tanks.

11. An apparatus as described having a pair of measuring tanks, feed and discharge conduits, means controlled by the liquid pressure in the respective tank being filled for alternate filling and discharge of the tanks, and means controlled by the first-named means and by a float means associated with the discharge conduit for suspending the liquid flow to both tanks.

12. In a liquid measuring device including two measuring tanks, a filling conduit, a discharge conduit, and a valve for closing said filling conduit, the combination of an element responsive to the liquid pressure in the tank being filled and movable by the pressure between end positions, and means controlled by said pressure responsive element while the latter is in said end positions for preventing closure of the valve and when in an intermediate position thereof to permit closure of said valve.

13. In a liquid measuring device including two measuring tanks, a filling conduit, a discharge conduit and a valve for closing said filling conduit, the combination of an element responsive to the liquid pressure in the tank being filled and movable by the pressure between end positions, means controlled by said element when in said end positions for preventing closure of said valve and when said element is in an intermediate position for permitting closure of said valve, and means operated by liquid in the discharge conduit for holding said means in preventing position regardless of the movement of said element from either end position.

14. In a liquid measuring device including two measuring tanks, a filling conduit, a discharge conduit, and a valve for closing said filling conduit, the combination of an element responsive to the liquid pressure in the tank being filled and moved from an end position to another upon a predetermined pressure in said tank, devices connected with said pressure responsive element for reversing the connection of said conduits to said tanks when said element has reached the said other end position, and valve blocking means controlled by said pressure responsive element during movement between its end positions to permit closing of said valve and operating when the pressure responsive element is in its end positions to prevent closing of said valve.

15. A device as in claim 14, including means operated by liquid in the discharge conduit for holding said valve blocking means to prevent closing of the valve.

In testimony whereof I have signed this specification.

MARIO CARBONARO.